United States Patent [19]

Adams

[11] Patent Number: 4,795,206
[45] Date of Patent: Jan. 3, 1989

[54] PICKUP TRUCK BED COVER SYSTEM
[75] Inventor: James P. Adams, Greeley, Colo.
[73] Assignee: Adelco, Inc., Greeley, Colo.
[21] Appl. No.: 55,922
[22] Filed: Jun. 8, 1987

Related U.S. Application Data

[63] Continuation-in-part of Ser. No. 884,490, Jul. 11, 1986.

[51] Int. Cl.[4] .............................................. B60J 7/10
[52] U.S. Cl. ...................................... 296/98; 296/100; 160/36; 160/201
[58] Field of Search ...................... 296/98, 100; 49/420, 49/421, 425, 426; 160/32, 36, 37, 133, 201, 202, 309, 310

[56] References Cited

U.S. PATENT DOCUMENTS

| | | | |
|---|---|---|---|
| 1,950,927 | 3/1934 | McMillan | 296/98 X |
| 2,248,538 | 7/1941 | Liebler | 296/98 |
| 2,963,856 | 12/1960 | Caddell | 160/201 X |
| 2,992,040 | 7/1961 | Groth et al. | 296/100 |
| 3,148,724 | 9/1964 | Chieger et al. | 160/201 X |
| 3,848,653 | 11/1974 | Youngs | 160/310 X |
| 4,013,113 | 3/1977 | Frei | 160/36 |
| 4,138,154 | 2/1979 | McKeon | 296/98 |
| 4,210,361 | 7/1980 | Marvin et al. | 296/100 X |
| 4,252,362 | 2/1981 | Campbell | 296/98 |
| 4,611,848 | 9/1986 | Romano | 296/98 |

Primary Examiner—Robert B. Reeves
Assistant Examiner—Russell D. Stormer
Attorney, Agent, or Firm—Klaas & Law

[57] ABSTRACT

A cover system for a pickup truck bed having an open top defined by vertical spaced apart side walls, and a front wall is disclosed. The cover system includes a rollable cover unit which has the capability of being either completely or partially extended or retracted to close or expose the truck bed. The cover portion consists of a multiplicity of adjacent transverse rigid panels which are continuously connected along their transverse length by flexible resilient connecting strip members of flexible and water resistant material. The cover unit is extended or retracted by a drive system located at the upper forward section of the truck bed. The drive system includes one or more pinion-type cylindrical drive roller members intermediate the side walls of the truck bed which are in driving contact with and have teeth to positively engage rack-type teeth on the underside of the cover panels. Controls and motor means are provided to control and activate the drive system. A power driven reeling system is provided adjacent to the drive system and connected to the cover unit so that movement of the reeling system will also assist the cover unit to the extended or retracted. The reeling system is linked in a coordinated manner with the drive roller members. In one embodiment, when the tailgate of the truck is removed or absent, the rear opening of the truck bed will be covered by driving the cover unit to the floor at the rear of the truck bed.

30 Claims, 6 Drawing Sheets

PICKUP TRUCK BED COVER SYSTEM

This application is a continuation-in-part of my prior copending application, Ser. No. 884,490 filed July 11, 1986 for PICKUP TRUCK BED COVER.

FIELD OF THE INVENTION

This invention relates to new and useful improvements in cover systems, and more particularly to a cover system for covering and locking the top of a conventional pickup truck bed or the like.

BACKGROUND

In the prior art, many attempts have been made at providing automated, weather and theft resistant, or load bearing vehicle covers. For example, Kirkum U.S. Pat. No. 4,518,194 discloses an automatic cover assembly for an open top pickup truck consisting of a series of travelling rectangular frames covered with a sheet of flexible material. The frames are stored in accordion folds in a box located at the front of the truck. Motor means are provided to drive and control the movement of the frames and cover sheet in the manner of a rack and pinion drive. However, this reference does not disclose a load bearing cover in which a portion of the drive system is integrated into the structure of the cover. It also fails to disclose a cover system that is wound on a reeling system or means for extending and driving the cover to the floor of the truck bed. Thorpe U.S. Pat. No. 3,774,958 discloses a dump truck having a continuous sheet metal cover which is wound upon a motor driven cylindrical drum which is located above and forward of the truck body. There are sinusoidal guides for the lateral edges of the sheet metal in the upper side walls of the truck body. The roll is contained on the drum by a plurality of rods positioned around the drum. The cover is moved along the guides to an open or closed position by rotation of the drum on which the sheet is wound. This references does not disclose a segmented load bearing cover in which a portion of the drive system is integrated into the structure of the cover, nor does it disclose means for extending and driving the cover to the floor of the truck bed. Additionally, it does not disclose a reeling and holding device for the cover which is separate from the drive system. Lamb U.S. Pat. No. 4,563,034 discloses a retractable cover for a conventional pickup truck which includes a pair of beaded edges, wherein each of these beaded edges is slidably engaged in a track mounted to the side walls of the truck bed. One end of the cover is attached to a spring-loaded roller, rotatably mounted to the forward section of the truck bed, and a locking mechanism is at or near the tail gate to maintain a spring bias when the cover is in an extended position. The cover system of this reference is operated and moved to a manually closed position, has no provision for a motor, and is not load bearing. The cover is retracted by the reeling action of the spring loaded roller, and is stored and held on the same spring loaded roller. There is no provision for driving the cover to the floor of the bed of the truck.

The Campbell U.S. Pat. No. 4,252,362 shows a conventional pickup bed with a cover comprised of a double-layered sheet of material. Slats may be fastened transversely between the layers. When the cover is only a sheet, it is housed on a reel. When it includes slats, it is stored in a fan-fold configuration, separate from a reel. The cover is supported slidably in a multi-channel track in the side walls. This allows the rear of the cover to be moved by hand through the chosen channel to the floor of the truck bed and define a closed compartment which is less than the total cargo area. The cover is extended by hand and withdrawn using a hand lever and a rack and pawl mechanism. There is no drive system to extend the cover or to drive it to the floor of the truck bed. Penner U.S. Pat. No. 4,046,416 describes an open truck body using a flexible cover that is wound on a spring loaded transverse longitudinal roller at one end of the truck box and connected at its other end to a pair of mounting plates which are, in turn, attached to an endless chain journaled around front and rear sprockets on each side of the truck body. A power source is connected to the sprockets and can effect the forward or rearward movement of the chain and mounting plates that cause the cover to move between its open and closed positions. Again, this reference does not disclose a segmented, load bearing cover in which a portion of the drive system is integrated into the structure of the cover. McKeon, U.S. Pat. No. 4,138,154 discloses a semi-truck trailer for bulk loading employing an overhead door composed of a multiplicity of pivotally connected, load bearing flat panels coupled to a rotatable drum around which the door is rolled when in its open position. The door is moved to its closed position by means of a cable journaled around a pulley at the rear of the trailer and attached to a hand-crank operated cable winding drum. It is moved to the open position by using a second crank which rotates the door winding drum to withdraw and store the door. The system is hand driven, by means of a crank, but the drive system is not integrated into the structure of the cover. Cross U.S. Pat. No. 3,649,072 teaches a manually operated, load bearing cover system in which a series of transverse interlocking slats are longitudinally moved to form a telescoped stack. The system has no drive means integrated with the cover, nor does it have means for storage on a reeling system.

Other prior art systems are disclosed in Liebler U.S. Pat. Nos. 2,248,538; Groth, et al. 2,992,040; McKeon 4,138,154; Marvin et al. 4,210,361 and Campbell 4,252,362.

SUMMARY OF THE INVENTION

It is, therefore, an object of this invention to provide a new and improved positively driven extendable and retractable load bearing cover means system for a pickup truck bed.

A further object is to provide a cover means comprising a plurality of relatively narrow width elongated rigid rectangular panel members which extend across the truck bed and are pivotally connected to one another by resilient flexible strip members which also extend across the truck bed and also, provide sealing means between adjacent panel members.

Yet another object is to provide such a cover system having a separate cover reel means for winding and unwinding of the cover means and a separate cover drive means for driving the cover means between a retracted storage position whereat the truck bed is uncovered and an extended covering position whereat the truck bed is covered and in which the reel means can also assist the drive means in taking-up and feeding the cover means.

A further object is to provide a combination of a cover means with integral driven teeth means and a motor driven cover drive means with teeth means driveably engageable with the integral driven teeth means on the cover means, and a motor driven reel means which are cooperably operable to positively uniformly apply equal balanced force to move the cover means between an extended covering position and a retracted storage position without causing lateral wobble and misalignment and binding.

Yet another object is to provide cover drive means comprising rack-type gear teeth means integrally formed on the lower surfaces of the panel members and elongated cylindrical drum pinion means with gear-type teeth mounted within the forward upper portion of the truck bed, whereby the cylindrical drum pinion means will positively engage a substantial length of the structural undersurface of the panel members in a manner to positively uniformly drive the cover means by uniformly applied force to thereby extend or retract it between positions which cover or expose the truck bed when the drive system is activated.

An additional object is to provide such a cover system wherein the cover means is movable by the cover drive means to a closed position in which the cover means is located adjacent the tailgate and/or adjacent the truck bed floor to provide a secure storage compartment in the truck bed.

Another object is to provide side rail cover guide and support track means mounted along the upper side surfaces of the side walls of the truck bed for slidably sealably supporting the panel members and which also may include storage box track means for slidably supporting storage box means beneath the cover means.

The present invention provides a new and improved cover system for a pickup truck bed having an open top defined by a front wall and a pair of vertical spaced apart side walls, and wherein cover support and guide track means are mounted longitudinally in the vicinity of the top edge of each side wall. The cover system includes a rollable, load bearing cover means which has the capability of being either completely or partially extended or retracted to cover or expose the truck bed by a drive system located at the upper forward section of the truck bed.

In a preferred embodiment, the drive system includes one or more rotatable elongated cylindrical drive members having elongated pinion-type peripheral teeth with the drive members being located intermediate the track means on the side walls of the truck bed. The cover means is generally rectilinear in shape and comprises a multiplicity of adjacent transverse rigid one-piece panel members which are pivotally connected to one another by continuous elongated flexible connecting means in the form of elongated strip members of flexible and water resistant material which are connected to adjacent panel side edge portions and extend the full width of the cover between the cover support tracks. The strip members also provide sealing and drainage means in the form of a channel for the natural drainage of water from the cover, and panel connecting edge portions which seal out water, dust and dirt. Each of the panel members are of substantially the same construction and design and are preferably made of one piece of extruded aluminum material having a generally rectangular cross-sectional peripheral configuration including a flat upper surface, a bottom surface and parallel side edge portions. Each panel member has a length sufficient to extend between the truck bed side walls with opposite end portions located in support tracks on the side walls of the truck bed. The bottom surface of each of the panel members have rack-like teeth means for engagement with pinion-like teeth means on cylindrical drum means driven by a motor means so as to cause substantially immediate continuous and controlled longitudinal movement of the cover means along the tracks mounted on the side walls.

In preferred embodiments, the separate reel means has a peripheral configuration which is non-circular, and provides at least two straight line segments. The reel means is preferably driven by a motor means separate from the cover drive drum means, but synchronized therewith so that both the cover drive drum means and the reel means are positively driven during winding and unwinding of the cover means while the cover means is driven between the open and closed positions. The motor means, the reel means, the cover drive drum means, and drive mechanisms associated therewith are preferably mounted in a drive system and cover storage box means at the front end of the truck bed.

The track means are preferably made of one piece of elongated extruded aluminum material having channel means integrally formed thereon for providing continuous support surfaces for the cover means and a continuous channel for receiving water from the cover means and carrying water to the rear of the truck bed. Low friction cover support bearing means are mounted on the track means and slidably supportably engage the lower surfaces of the panel members. Sealing strip means are mounted on the track means for sealably engaging the upper surfaces of the panel members. In addition, the track means may provide box support channel means for supporting the drive system storage box means and other storage box means which may be slidably movable therealong beneath the cover means.

In preferred embodiments, the cover panels constituting the cover means are substantially water impermeable, tear and cut resistant, and rigid, so that when they are connected together and the cover portion is fully extended, the cover portion will be substantially impervious and load bearing, and will fully protect the pickup truck bed from wind, rain weather, theft, and vandalism.

BRIEF DESCRIPTION OF THE DRAWINGS

Illustrative and preferred embodiments of the invention are shown in the accompanying drawings wherein.

DETAILED DESCRIPTION OF THE INVENTION

Now referring to the drawings, the present invention provides a cover system 10 for a pickup truck 12, having a cargo space bed with an open top defined by floor 14, front wall 16 and a pair of vertical spaced apart side walls 18, 19 which terminate in inwardly extending upper flange portions 20, 21, all such walls being normal to floor 14. The terms front, rear, side, upper, lower, inner, outer and the like, as used in this description and in the claims, relate to the cover system as mounted and operated relative to the pickup truck and the truck bed.

Figure 1:
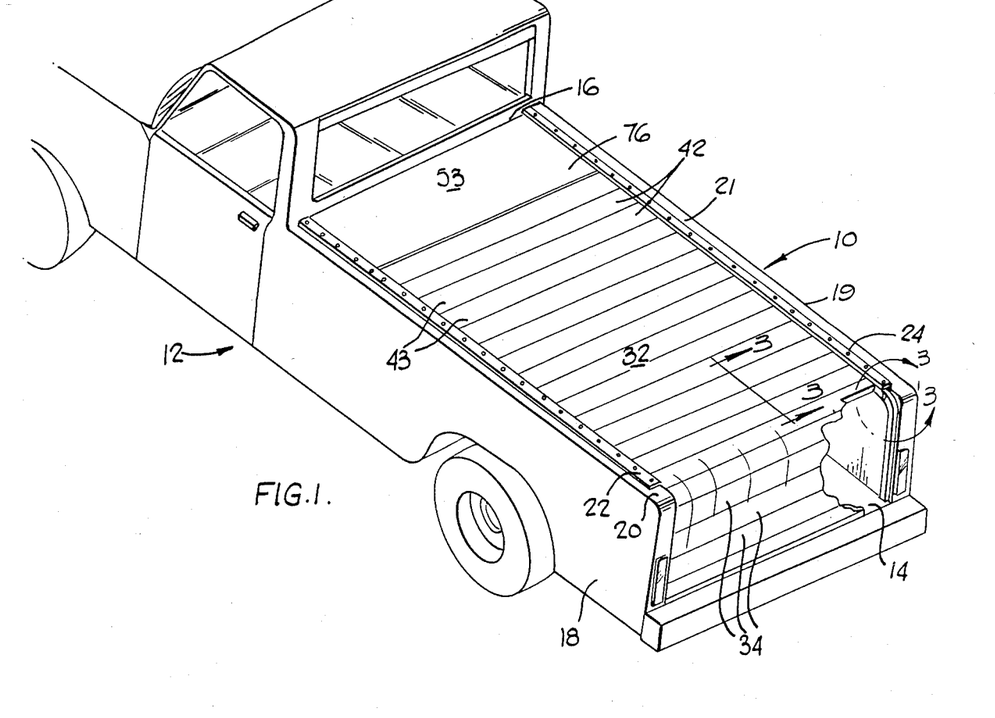
FIG. 1 is a diagrammatic, partially broken away perspective view of a conventional pickup truck with the tail gate removed and showing one embodiment of the invention wherein the cover means is associated with guide and support track means having a downwardly extending rear end portion so that in the fully extended closed position, the cover means extends to the floor of the truck bed.

The cover system comprises a pair of cover supporting track means 22, 24 mounted longitudinally along upper flange portions 20, 21 of the truck bed side walls 18, 19, respectively. As shown in FIG. 3, in one illustrative embodiment the track means 22, 24 comprise elongated track members having an open C-shaped channel means 25 and may be formed, for example, as a single piece, or which may be formed, for example, from the joinder of cap plate 26 and an S-shaped side bracket 28. In the embodiment of FIG. 1, the track means 22, 24 are extended to the floor 44 while in the embodiment of FIG. 2, the track means terminates adjacent a tailgate at the rear of the truck bed.

Figure 2:
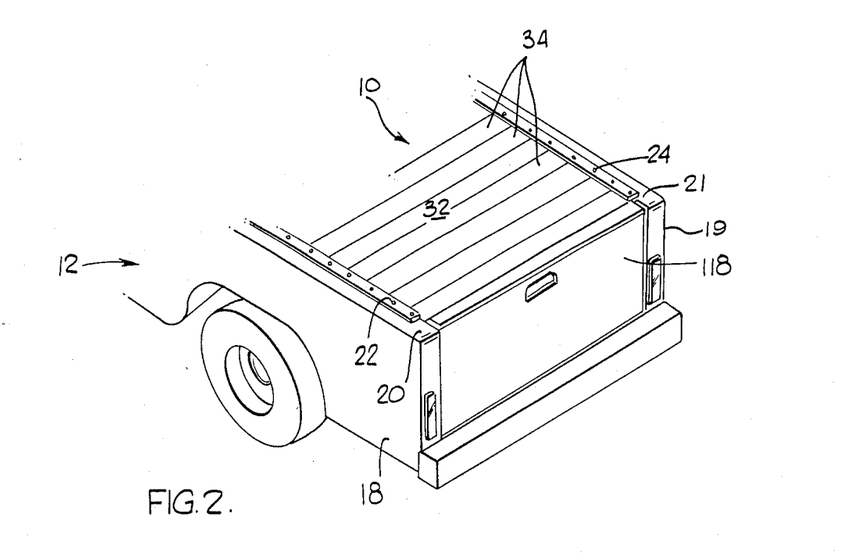
FIG. 2 is a diagrammatic perspective view of an alternative embodiment of the invention of FIG. 1, with the tail gate of the truck in place and the cover means associated with horizontal guide and support track mans and with the cover means extended in its closed position to engage the tail gate.
Figure 3:
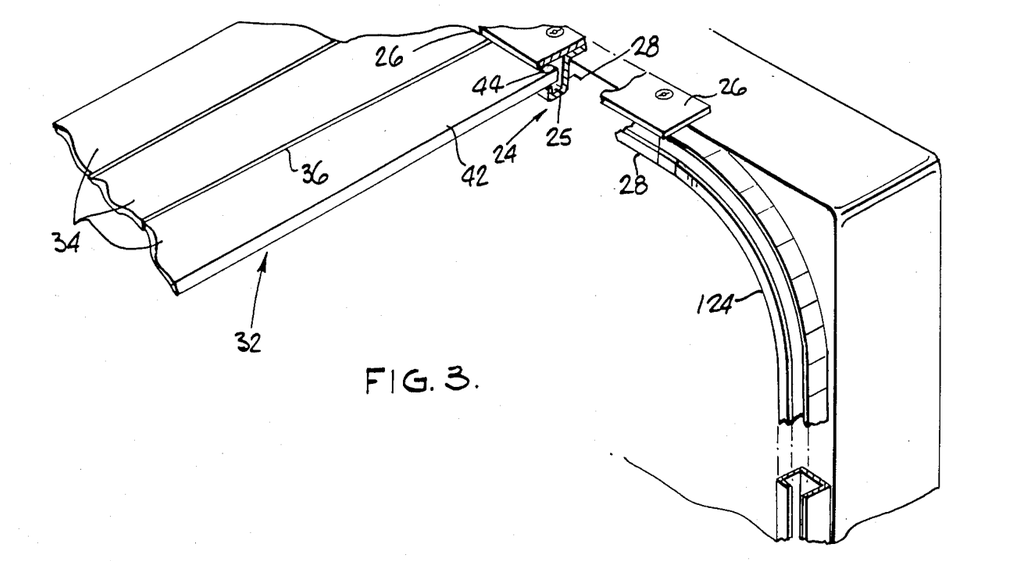
FIG. 3 is an enlarged inside rear perspective view of the truck bed taken at cutaway 3—3 of FIG. 1, showing the details of a section of one of the tracks in relation to the cover means, and also showing the nature of the downward track extension as used when the tail gate is removed.

Cover system 10 also comprises a rollable cover means 32 which has the capability of being either completely or partially extended or retracted to cover or to expose the open top, or the open top and rear of the truck bed, as shown in FIGS. 2 and 1, respectively. Cover means 32 is generally rectilinear in shape and comprises a plurality of adjacent transverse panel members 34 which are connected along their adjacent transverse edges by pivotal connecting and sealing means 36, FIG. 4. In preferred embodiments, connecting and sealing means 36 comprise separate individual elongated one-piece strip members made of flexible and water resistant material and extend the full length of and are continuously pivotally connected to each of adjacent panels 34. The connecting and sealing means 36 have a central body portion 37 of truncated V-shaped tooth cross-sectional configuration with a central elongated U-shape channel 38 providing transverse fluid flow drainage channel means for the drainage of water from the cover, and side edge connecting flange portions 39 40 providing sealing means to prevent water, dust and dirt from infiltrating through cover 32. The panel members 34 have a length such that opposite end portions 42, 43, FIG. 1, of each panel extend into and are supported by, and slidably ride within the channels 25 of tracks 22, 24. Weather strip means 44, FIG. 3, are secured to the top of each channel member 25 and are positioned to bear against the top surfaces of end portions 42, 43 of panels 34 to provide a dust and water seal.

Figure 4:
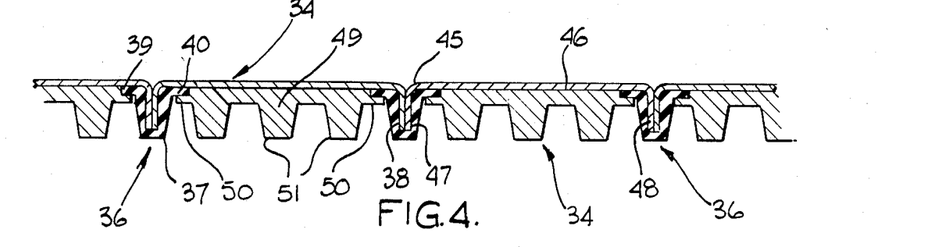
FIG. 4 is a partial cross-sectional view taken along 4—4 of FIG. 1 showing details of one embodiment of the cover means.

In the embodiment shown in FIG. 4, each panel unit 34 comprises an uppermost channel-shape member 45 having a flat central intermediate portion 46 and downwardly extending side flange portions 47, 48 which are located in channels 38 of the connecting and sealing means 36. The bottom surface of each panel 34 carries elongated rigid reinforcing strips 49 which extend from end to end of each panel and serve several purposes. First, they provide panel reinforcement means to reinforce the strength and load bearing capacity of each panel 34, and therefore, also reinforce the strength and load bearing capacity of the entire cover 32. Additionally, reinforcing strips 49 provide holding flange means 50 for fixedly holding side flange portions 39, 40 of the flexible strip members 36 in place on the uppermost members 45 and thus assist in providing pivotal connecting and sealing means joining adjacent panels 34. Finally, they provide a series of rack-like elongated truncated V-shape teeth and grove means 51 on the lower surface of each panel for positive mechanical driving interaction with corresponding toothed means of a cover drive system 52, FIGS. 5 & 6, as detailed below. It is noted that the bottom and side surfaces of flexible strip members 36 also provide rack-like teeth means for positive mechanical interaction with associated drive system apparatus 52. In the preferred embodiment, the teeth means are of the same size and shape and are uniformly spaced from one another along the length of the cover.

In preferred embodiments, drive system 52 will be located at the forward portion of the truck bed within a covered support and storage housing means 53, FIG. 1. Cover drive system 52 comprises one or more rotatable elongated cylindrical drive roller means 54, FIGS. 5 & 6, located below the cover means intermediate track means 22, 24 between opposite panel end portions 42, 43. The cylindrical surface of each drive roller 54 carries elongated truncated V-shape pinion-like gear teeth for positive mechanical interaction with an elongated portion of the rack-like teeth on the undersurface of the panel member of cover 32. Thus, the teeth on the undersurface of cover 32 can be seen as providing a first cover drive connecting tooth means, while the teeth on the surface of drive roller 54 can be seen as providing a second cover drive connecting tooth means.

Figure 5:
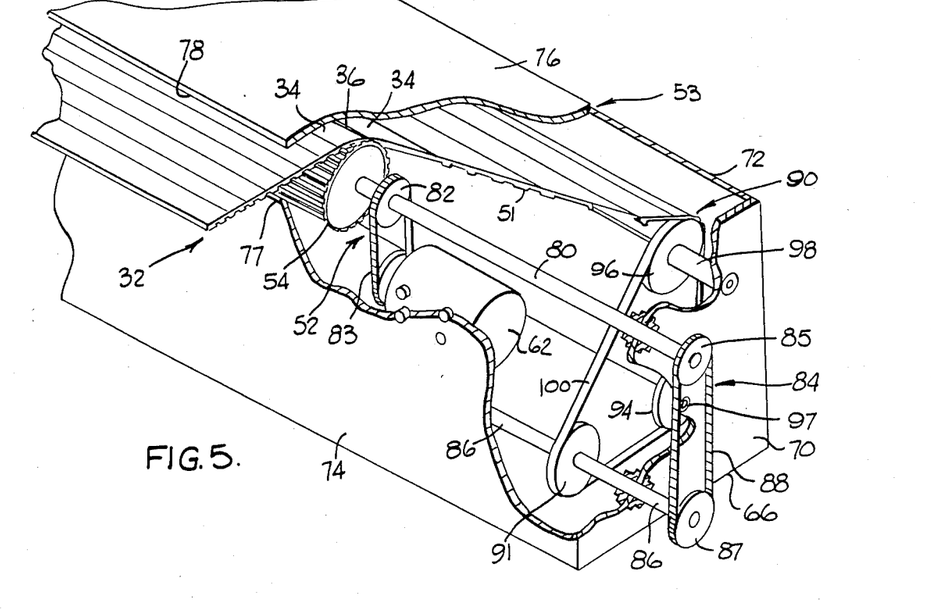
FIG. 5 is a fragmentary, partial isometric, partially broken away view of one embodiment of a cover drive and reel system in association with a storage box.
Figure 6:
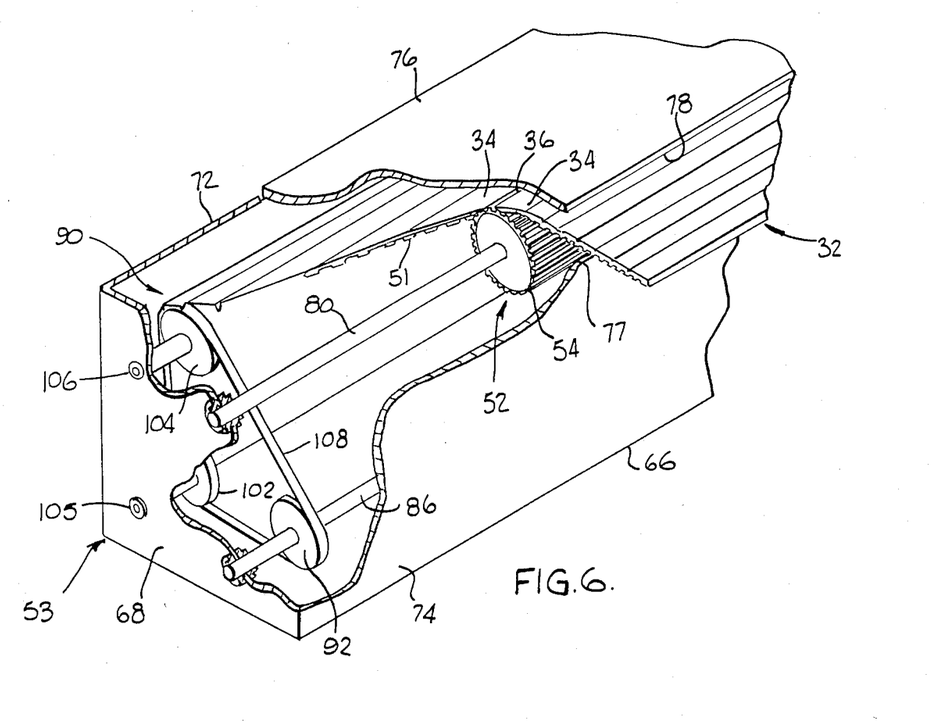
FIG. 6 is a fragmentary, partially broken away isometric view of the opposite end of the apparatus shown in FIG. 5.

In operation, a portion of the first cover drive connecting tooth means on the underside of cover 32 will always be in driving contact with, and will be positively engaged by a portion of the second cover drive connecting tooth means of the cylindrical drive roller means 54. As shown in FIGS. 5 and 6, engagement of each panel member with drive roller means 54 causes pivotal displacement of adjacent panel members about flexible pivotal connecting and sealing members 36 and the rotation of drive roller means 54 will cause substantially immediate and controlled longitudinal movement of cover 32 along tracks 22, 24.

In the presently preferred embodiment, the tooth means on the bottom surface of the panel members of cover 32 comprise tooth and groove portions which extend completely across the entire length of each panel member, while the second connecting tooth means carried by the surface of drive roller means 54 will be in the form of elongated tooth and groove portions of corresponding shape designed to mate with and to positively engage the teeth on the bottom surface of cover 32 which extend substantially continuously from side to side and from end to end of the cover. Other mating forms of first and second connecting tooth means may be possible, but the elongated truncated V-shape teeth are preferable.

As shown in FIGS. 5 & 6, the drive system 52 including an electrically operable gear drive motor 62 is preferably housed in a box-like support and storage housing means unit 53 which comprises a bottom plate 66, a pair of end side plates 68, 70, a front plate 72, a rear plate 74, and an openable or removable top plate 76. The upper edge 77 of rear plate 74 is downwardly spaced from top plate 76 so as to provide a cover slot means 78 through which cover 32 can enter and exit housing means unit 53 In preferred embodiments, housing means unit 53 will be located adjacent front wall 16 of the truck bed and mounted on and secured to tracks 22, 24. Unit 53 may be of a size and shape and supported in such a manner that there are at least about four or more inches of clearance between bottom plate 66 and truck bed floor 14 so a to allow long cargo items to be placed on floor 14 of the truck bed and be slid forward under housing means unit 53.

The drive system within housing mean unit 53 further comprises a transverse roller drive shaft means 80 which is journaled for rotation by suitable bearing means mounted in each end plate 68, 70. Where a single drive roller means 54 is used, it will be substantially centered on shaft 80 between opposite panel end portions 42, 43. Where more than one drive roller means 54 is used, they will be axially aligned with on another and axially spaced along shaft means 80 between opposite panel end portions 42, 43 so that their aligned cylindrical surfaces, and the axial spacing thereinbetween, effectively acts and generates a single continuous cylinder extending the entire length of the panel members.

Motor 62 may be mounted on rear plate 74 and connected to a sprocket gear 82, FIG. 5, secured to shaft 80 by drive chain means 83 connected to gear motor 62 whereby rotation of gear motor 62, in either direction, will cause positive, non-slip rotation of shaft 80 and associated drive roller 54. Shaft means 80 also is connected to a reel drive means 84 comprising a second sprocket gear 85 on an end portion of shaft 80 which extends beyond end plate 70 into an overhang space adjacent truck bed side wall 19 beneath flange portion 21. A second transverse drive shaft means 86, parallel with and adjacent to shaft 8 is journaled for rotation through each end plate 68, 70 and has a sprocket gear 87 which is connected to sprocket 85 by drive chain means 88 so that whenever shaft 80 is rotated shaft 86 will also be caused to simultaneously rotate in the same direction.

Figure 7:
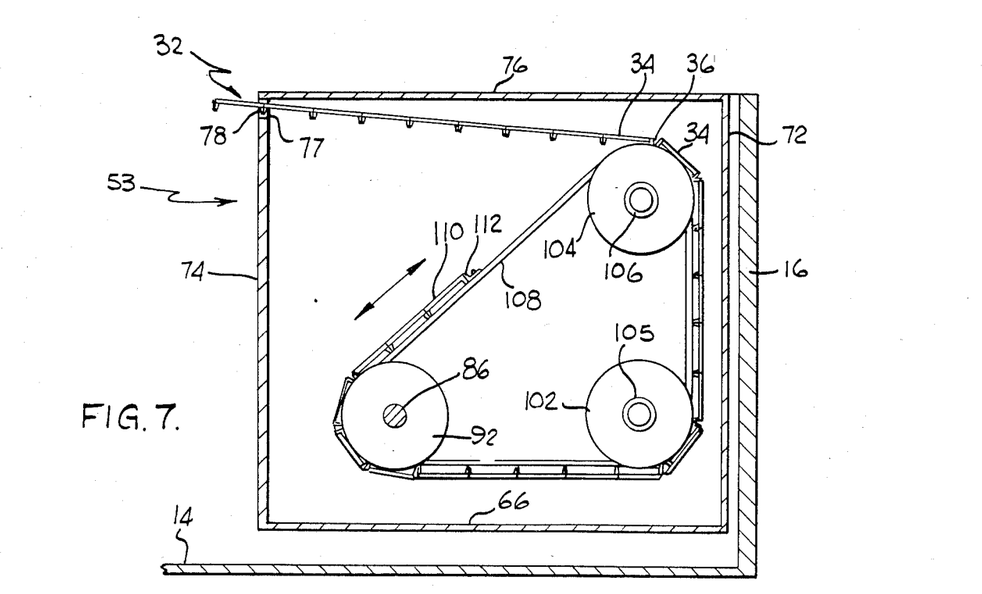
FIG. 7 is a diagrammatic cross-sectional end view of a portion of the apparatus shown in FIGS. 5 & 6.

A cover reel means 90 is provided in housing means 53 to assist in feeding or taking up cover 32 as it is extended or retracted by the rotation of drive roller means 54. In the embodiment of FIGS. 5 & 6, the reel means comprises a pair of spaced apart drive pulley means 91, 92 on opposite end portions of rotatable drive shaft 86; two idler pulley means 94, 96, FIG. 5, rotatably mounted on parallel stub shaft means 97, 98 supported by end wall 70, connected to one another and to drive pulley 91 by endless flexible belt 100; and two idler pulley means 102, 104, FIG. 6, rotatably mounted on stub shaft means 105, 106 on end wall 69 and connected to one another and to drive pulley 92 by endless flexible belt means 108. Opposite idler pulleys 94, 102 and 96, 104 and their associated support shafts 97, 105 and 98, 106, respectively, are coaxial so that each opposite set of reel pulleys 91, 94, 96 with belt 100; and reel pulleys 92, 102, 104 with belt 108 form symmetrical, non-circular cover support reel means at each side end of the storage unit which are moved simultaneously along a path of movement having three equal length straight line segments and three curved line segments. The rotation of shaft 84 will cause the two sets of cover support reel means to move in unison as a single reel system, and together, as shown in FIG. 7, serve the function of a cover winding reel means within storage unit 64. Opposite end portion of the first end panel member 110 of cover 32 are fixedly pivotally attached to each of the belt means 100, 108 by pivotal connecting means and rivets 112, for example, so that rotation of shaft 84 will cause coordinated movement of belt means 100 and 108 with the result that the opposite end portion of cover panel members 34 will be supported on and carried around the perimeter of the belts 100, 108, as shown in FIG. 7, to enable the cover means to be wound on and unwound from the reel means. The belt means engage and support lower surfaces of the panel members adjacent the opposite end portions of the panel members associated with the guide and support track means. The reel system also provides a second drive source to and for the cover 32 as the cover 32 is extended or retracted. As shown, in preferred embodiments the reeling system will be linked to motor 62 and will be activated in a coordinated manner with the roller drive system 52 so that the reeling system will be simultaneously activated to retract and extend cover 32. Activation and control of motor 62 will be by means of conventional electrical control system 120.

In one embodiment of the present invention, when tail gate 118 is removed, a channel-shape track extension, such as 124 shown in FIGS. 1 and 3, may be added at the rear of each track 22 and 24. The track extension, such as 124, will turn through a short radius and continue downward to floor 14 of the truck bed. Such extension of cover 32 downward to floor 14 can be accomplished by the present invention due to the design of the cover 32 which allows flexible movement around a curved track, and the positive driving action of drive roller 54 on the underside of cover portion 32. Such positive driving action provides for the driven extension of cover 32 along the downward continuation provided by track 124 and the downward extension of tracks 22, 24 to floor 14 of the pickup truck bed to close the opening at the rear of the truck bed with or without the presence of a tailgate 118.

As previously noted, in preferred embodiments cover panels 34 constituting cover 32 will be substantially water impermeable, tear and cut resistant and rigid, and the pivotal connecting and sealing mean 36 will be so hidden or inaccessible, that when the panels are connected together and cover 32 is fully extended, the cover means will be substantially impervious and load bearing, and substantially fully protect the pickup truck bed from wind, rain, weather, vandalism and theft. As one means of obtaining this goal, metal may be used to form the panel, or at least at the exposed top surface of each cover panel 34. This vastly increases the cover 32 protection against forced entry and against destructive elements.

In preferred operations, movement of cover 32 will be stopped at either end of its cycle by suitable limit switch controls, not shown, and will also be capable of being selectively stopped, or reversed at any intermediate open or closed position by control system 120 which may be preferably located inside the truck cab. In the closed position, the cover cannot be moved without activation of the drive system. When the cover extends horizontally to a tailgate 118 as shown in FIG. 2, a lock, not shown may be provided between the rear edge of cover portion 32 and tailgate 118 as hereinafter described.

A presently preferred embodiment of the invention is shown in FIGS. 8-13 in combination with a pickup truck bed 200 comprising a bottom wall portion 201, side wall portions 202, 203, with inwardly extending upper wall flange portions 204, 205, and a front end wall portion (not shown) which define a generally rectangular load space 208. A multiple panel cover means 210 is slidably movably supported between spaced parallel support and guide track means 211, 212 mounted on upper inwardly and downwardly extending end flange portions 204, 205 of bed side wall portions 202, 203. A pair of coaxial cylindrical cover drive means 215, 216 and a pair of coaxial cover reel means 217, 218 are mounted in a support and storage housing box means 219 supported by track means 211, 212. Cylindrical drive means 215, 216 are selectively rotatably driven by a conventional low voltage DC electric motor means 220 through conventional gear transmission means 221 and shaft means 222. Reel means 217, 218 may be rotatably drive by another conventional low voltage D.C. electric motor means 223 through conventional gear transmission means 224 and shaft means 225. Electric motor means 220, 223 are operable by the vehicle electrical system through a conventional electronic motor control and synchronization means 226. A remote control panel means (not shown) may be mounted on or adjacent the storage box means 219 and/or in the truck cab.

Figure 9:
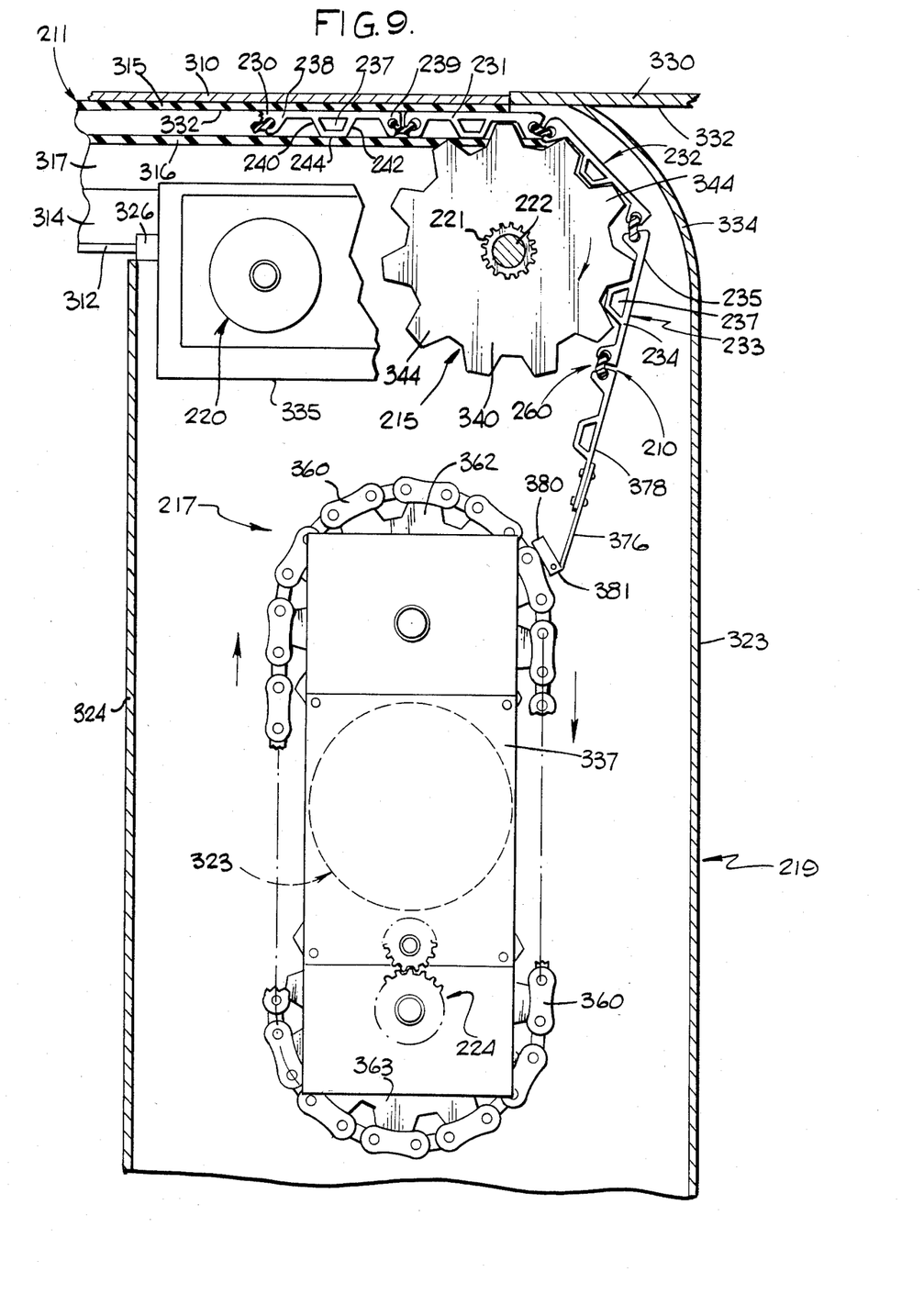
FIG. 9 is a partial end view of a portion of the apparatus of FIG. 8 showing the cover means, the cover drive means and the cover reel means.
Figure 10:
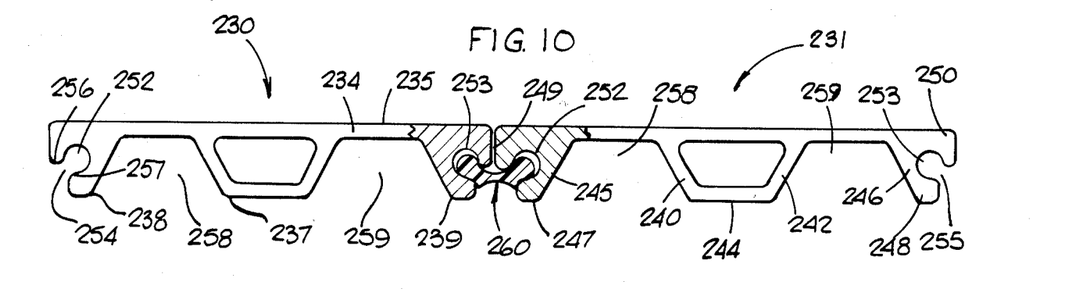
FIG. 10 is an enlarged end view, partly in cross-section, of a portion of the cover means shown in FIG. 9.

As shown in FIGS. 9 & 10, cover means 210 comprises a plurality of elongated rigid plate members 230, 231, 232, 233, etc. made from one continuous piece of extruded aluminum material of generally rectangular cross-sectional configuration of relatively narrow width (e.g. approximately 2.0 inches) and narrow thickness (e.g., approximately 5/16 inch). Each plate member comprises a flat upper plate portion 234 having a flat upper surface 235, a central hollow rib portion 237 and hollow side rib portions 238, 239 which extend the entire length of the plate member. Central rib portion 237 has inclined side wall portions 240, 242 connected by a flat bottom wall portion 244. Each side rib portion 238, 239 has an inclined side wall portion 245, 246, a flat bottom wall portion 247, 248 and a flat side wall portion 249, 250. Elongated circular connecting grooves 252, 253 extend along each side rib portion between side wall portions 245, 249 and 246, 250; and are intersected by elongated slots 254, 255 defined by curved side surfaces 256, 257. Inclined side wall portions 240, 245 and 242, 246 define integral continuous elongated truncated V-shape rack-like gear tooth grooves 258, 259; and central rib portion 244 and adjoining end rib portions 245, 246 define integral continuous elongated truncated V-shape rack-like tooth means which correspond to tooth means on the cylindrical drive means 215, 216.

The adjacent panel members are connected by a plurality of separate elongated resilient connecting and sealing strip means 260 made of one continuous piece of elongated extruded resilient material such as silicon rubber or other suitable plastic material, which extend the entire length of the panel members. Each connecting means member comprises a pair of side rib portions 262, 264, FIG. 11, of semicircular cross-section connected by an intermediate web portion 266 having curved upper and lower surfaces 268, 270. A pair of elongated lip portions 272, 273 are connected to side rib portions 262, 264 by curved surfaces 274, 276 which correspond to curved surfaces 256, 257 on panel side wall portions 238, 239.

Figures 11, 12, 13:
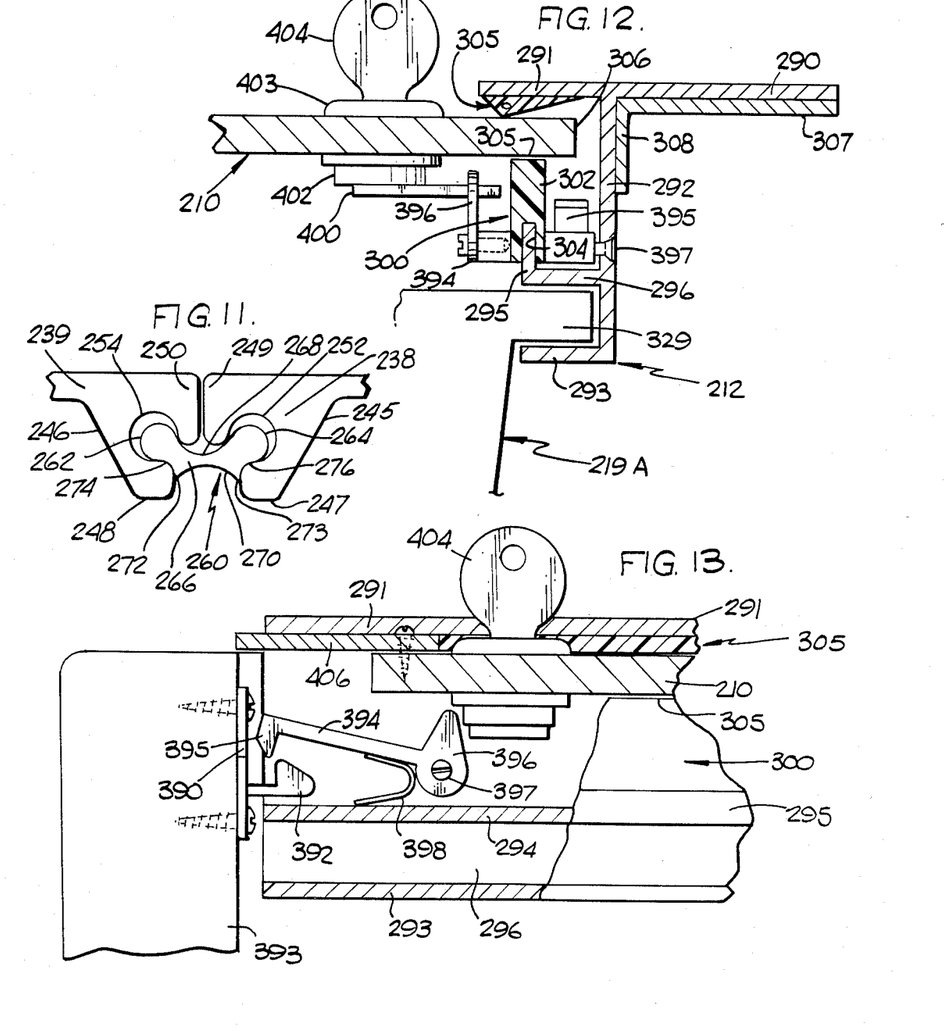
FIG. 11 is an enlarged partial view of the pivotal connecting and sealing means shown in FIG. 10.
FIG. 12 is a cross-sectional transverse side view of a presently preferred embodiment of the guide and support track means and also illustrating an optional tailgate locking apparatus of the apparatus of FIGS. 8–11.
FIG. 13 is a partial cross-sectional longitudinal view of the tailgate locking apparatus of FIG. 12.

The radius of panel grooves 252, 253 is substantially larger than the radius of connecting member rib portions 262, 264. The distance between panel curved surfaces 256, 257 is preferably slightly smaller than the distance between connecting member curved surfaces 274, 276 so as to provide a slight compressive fit therebetween so as to provide a seal in conjunction with connecting member lip portions 272, 273. The connecting members 260 are associated with the panel members by longitudinal sliding movement from one end to the other end of the panel members. After assembly, the connecting member side rib portions 262, 264 are held in the panel grooves 252, 253 of adjacent panel members while enabling pivotal movement of one panel member relative to an adjacent panel member, preventing separation of and holding adjacent panel members in closely spaced adjacent relationship, providing a continuous seal along the entire length of the interface between adjacent panel members, and providing a drainage channel along upper curved surface 268 which extends the entire length of the panel members. During linear movement of the cover along from the retracted position to the extended position, the panel members are pushed along the side track means by abutting engagement between adjacent panel members. During linear movement in the opposite direction, the panel members are pulled through pivotal connecting and sealing means members 260. During travel along a curved path of movement, adjacent panel members are pivotal displaceable relative to one another by engagement between rib side surfaces 249, 25 and rounded surfaces 256 and/or by relative displacement between the end panel members and the pivotal connecting and sealing means members 260 and/or resilient deformation of the pivotal connecting and sealing means members 260.

Figure 8:
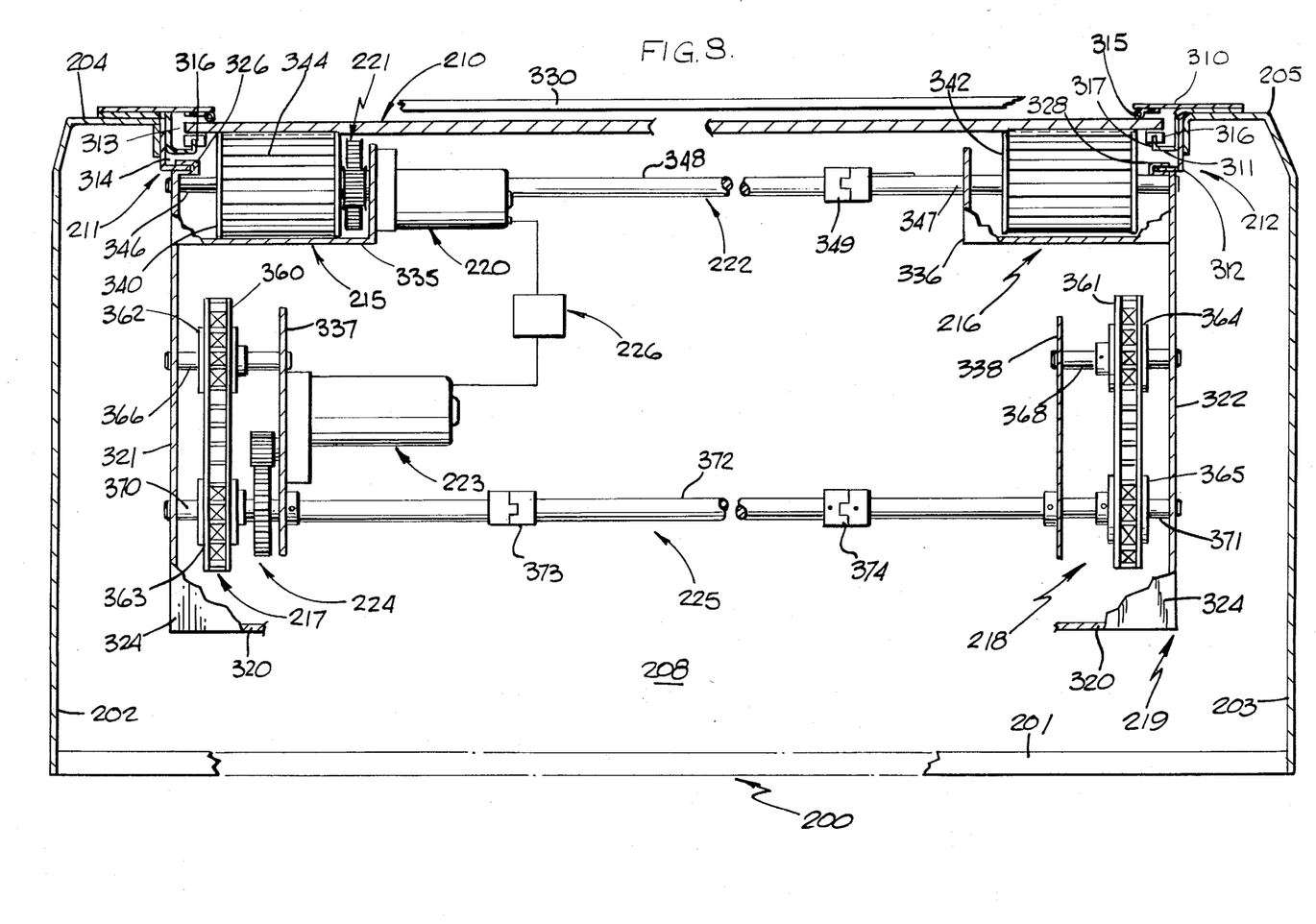
FIG. 8. is a cross-sectional side elevational view, with parts broken away, of a preferred embodiment of the invention.

As shown in FIG. 12, each of the support and guide track means 211, 212 preferably comprises an elongated one piece member made of extruded aluminum material having an upper outwardly extending flange portion 290, an upper inwardly extending flange portion 291, a downwardly extending flange portion 292, a lowermost inwardly extending flange portion 293, and an intermediate inwardly extending flange portion 294 which terminates in an upwardly extending flange portion 295. Flange portions 292, 293, 294 define an inwardly facing U-shape storage box guide and support channel 296 for receiving flange portions of the drive system storage box means 219 and other storage box means 219A for tools or the like. Flange portions 292, 294, 295 define an upwardly facing U-shape drainage channel 297. A wear-resistant, low-friction panel support bearing means 300 in the form of an elongated one-piece strip 302 of plastic material, such as nylon, with a rectangular cross-section and having a lowermost rectangular slot 304 and an uppermost flat panel support surface 305 is mounted on and extends along flange portion 295 to slidably supportively engage the lower surfaces of opposite end portions of the panel members. The upper surfaces of opposite panel end portions are located in abutting engagement with an elongated resilient flexible sealing strip means member 305 mounted on and beneath the lower surface of flange portion 291 and the end side surfaces 306 of the panel members are located above channel 297 in inwardly spaced non-contacting relationship to the inner side surface of flange portion 293. Flange portions 290, 292 abut and are fixedly secured to bed side wall portions 307, 308 by suitable means such as threaded fasteners (not shown). An alternative form of the cover guide and support means is shown in FIG. 8 wherein separate elongated plate members 310, 311, 312 are utilized to provide corresponding flanges and channels 313, 314 corresponding to the one-piece structure of FIG. 12. An upper sealing strip means 315 is mounted on plate members 310 and a bearing strip means 316 is mounted on a flange portion 317 of plate member 311.

As shown in FIGS. 8 & 9, drive system storage box means 219 comprises a bottom wall portion 320, side wall portions 321, 322 and front and rear wall portions 323, 324. Side wall portions 321, 322 may have slidable support means 326, 328 along the upper edge portions for slidable supporting engagement with track means 211, 212. In the embodiment of FIG. 8, the support means comprises an U-shape channel member whereas in the embodiment of FIG. 12, the support means may comprise a flange portion 329. As shown in FIG. 9, a cover member 330 is mounted on and extends across the bed side panels over the top front portion of the drive system box means 219 and has a lower guide surface 332 located closely adjacent the upper surface of the cover means. The upper portion 334 of box front wall 323 may be curved to prevent binding of the cover panel members. The drive system support box means further comprises support bracket means 335, 336, 337, 338 for the shafts and motors associated with drive drums 215, 216 and the reel means 217, 218.

Each of the elongated cylindrical drive means 215, 216 comprise an elongated cylindrical member 340, 342 having elongated pinion-type teeth 344 on the outer peripheral surface which correspond to the rack-like teeth on the lower side of the panel members. In a presently preferred embodiment, the cylindrical members 340, 342 are made of one piece of plastic material such as nylon and are suitably connected to end sections 346, 347 of rotatable drive shaft means 222 which may include intermediate sections 348 and adjustable coupling means 349. The shaft sections 346, 347, 348 are suitably rotatably supported by box side wall portions 321, 322 and bracket means 335, 336 and are driven by motor means 220 through suitable transmission gear means 221.

Each of the reel means 217, 218 comprise an endless loop chain means 360, 361 mounted on sprocket wheel means 362, 363 and 364, 365, respectively, between box side wall portions 321, 322 and support bracket means 337, 338. Sprocket wheels 362, 361 are freely rotatably supported on coaxial shaft members 366, 368. Sprocket wheels 363, 365 are driveably connected to end shaft sections 370, 371 of drive shaft means 225 which may include an intermediate shaft section 372 and suitable adjustable coupling means 373, 374. Drive shaft means 225 is rotatably driven by motor 223 and gear transmission means 224. Cover means 210 is connected to each reel chain means 360, 361 by pivotal connecting means in the form of a plate member 376, FIG. 10, fixedly mounted on an end panel member 378 of slightly different configuration than other panel members, a plate member 380 fixed to the chain, and a pivot pin connecting member 381. Chain members 360, 361 are located beneath the drum means 215, 216 in alignment with end portions of the panel members which are supported on and extend between the chain members during winding and unwinding thereon. Thus, the chain means provide two straight line and two curved panel support portions. The size, spacing and arrangement of the reel means may be varied as necessary or desirable to accommodate varying length cover means.

As shown in FIGS. 12 and 13, a tailgate locking means may be provided for locking a tailgate to the cover means in the extended bed closing position. A hook plate member 390 having a hook portion 392 is fixedly mounted on tail gate 393. A latch means 394 having a hook portion 395 and a cam portion 396 is suitably pivotally connected to rail means 212 a 397 and biased to an open, unlatched position by a spring member 398. A striker plate member 400 is carried by a rotatable shaft member 402 associated with a locking mechanism 403 operably by a key member 404. When strike plate 400 engages cam member 396, hook portion 395 on latch member 394 will engage hook portion 392 on plate member 390. A plate member 406 may be mounted on the rear end panel member of cover means 210 so as to extend between the tail gate 393 and the cover means to cover the interface therebetween and prevent fluid flow and tampering.

The construction and arrangement is such that at least two of the panel members are in engagement with the drive drum means as illustrated in FIG. 10. All of the intermediate panel members between the end panel members are of the same size and shape and the same one-piece construction and design. All of the resilient panel connecting means are of the same size and shape, and the same one-piece construction and design. The construction and design of the reel means is such as to support and drive both sides of the cover means while requiring a minimum number of parts and a minimum amount of space in the drive system storage box means. The construction and arrangement of the drum drive means is such as to provide positive, non-slip continuous driving engagement with both sides of the cover means over a substantial length thereof to prevent binding and lateral misalignment of the cover means relative to the side rail means. The construction and arrangement of the side rail means is such as to enable usage of one-piece extruded material of the same size and shape and the same construction and design.

While the invention has been particularly shown and described with reference to illustrative and presently preferred embodiments thereof, it is intended that various modifications be included within the scope of the invention as claimed, except as precluded by the prior art.

The invention claimed is as follows:

1. A cover system for a pickup-type truck or the like having an elongated truck bed with a horizontal truck bed floor portion, a pair of laterally spaced parallel vertically extending side wall portions, and a front end vertical wall portion defining a cargo space therebetween with an open top portion and an openable rear end portion, the system comprising:

cover means for covering the open top portion of the truck bed and being movable from an open storage position whereat the opening is uncovered and a closed covering position whereat the opening is closed by the cover means;

laterally spaced parallel cover guide and support track means mounted along a top portion of both of said truck bed side wall portions for slidably guiding and supporting said cover means during movement between said open storage position and said closed covering position;

said cover means comprising:

a plurality of separate elongated rigid panel members having a length such as to extend transversely across the entire width of the cargo space between said track means and having side edge portions located in side by side relationship and having opposite end portions mounted on and supported by said track means;

separate flexible resilient pivotal panel connecting and sealing means having side edge portions for continuously connecting adjacent side edge portions of adjacent ones of said separate panel members to one another along the entire length of said panel members between said track mean and for preventing fluid flow through the space between adjacent panel members across the cargo space;

housing means located within said cargo space beneath said open top portion at the front end of the truck bed for holding said cover means in the open storage position;

cover drive means mounted in said housing means for driving engagement with said panel members intermediate said track means and for moving said cover means between said open storage position and said closed covering position;

reel means in said housing means for supporting said cover means and enabling said cover means to be wound thereabout during movement from the closed covering position to the open storage position and to be unwound therefrom during movement from the open storage position to the closed covering position; and motor means mounted in said housing means and being operably connected to said cover drive means and said reel means for selectively causing synchronized movement of said cover means between said open storage position and said closed covering position by positive direct synchronized driving engagement between said cover means and each of said cover drive means and said reel means.

2. The invention as defined in claim 1 and wherein said cover drive means further comprising:

a plurality of toothed means mounted on the lower side of said panel members for applying driving force to said over means through said panel members; and motor driven toothed drive means for drivable connection with said toothed means.

3. The invention as defined in claim 2 and wherein said toothed means extending across substantially the entire length of each of said panel means.

4. The invention as defined in claim 3 and wherein:

said motor driven toothed drive means comprising at least two cylindrical elongated drum members mounted on opposite sides of the cargo area adjacent the truck bed side wall portions.

5. The invention as defined in claim 4 and wherein:

said toothed means comprising rack-like teeth; and said toothed driving means having pinion-like teeth corresponding to said rack-like teeth.

6. The invention as defined in claim 5 and wherein:

said separate panel members being made from elongated one-piece lengths of aluminum material of the same cross-sectional configuration.

7. The invention as defined in claim 6 and wherein:

said panel members having a generally rectangular cross-sectional configuration and including a flat upper surface portion, a pair of generally flat side edge surface portions and a toothed bottom surface portion defined by alternating rack-like rib portions and groove portions.

8. The invention as defined in claim 7, wherein said side edge surface portions of adjacent ones of said panel members being located in closely spaced parallel adjoining relationship in the extended straight covering position and being pivotally displaceable relative to one another during movement along a curved path.

9. The invention as defined in claim 8 and wherein said alternating rack-like rib portions and groove portions comprise:

at least one central rib portion providing a full tooth portion with two adjacent groove portions on opposite sides of said central rib portion; and a side edge rib portion along each side edge surface providing a one-half tooth portion whereby adjacent side edge rib portions of adjacent panel members define a full tooth portion.

10. The invention as defined in claim 9 and wherein:

each of said side edge rib portions having an elongated groove means extending therealong for receiving and retaining side edge portions of said panel connecting and sealing means.

11. The invention as defined in claim 10 add wherein each of said panel connecting and sealing means comprising:

an elongated strip member made of one piece of resilient flexible material and having an upper surface portion, a lower surface portion and opposite side edge rib portions extending across the cargo space along and connected to adjacent ones of said panel members by said side edge rib portions being mounted in and retained by said groove means.

12. The invention as defined in claim 11 and wherein said elongated strip member further comprising:

fluid flow channel means extending along said upper surface portion of said elongated strip member between the opposite end portions of adjacent panel members for enabling fluid flow therealong to said guide and support track means.

13. The invention as defined in claim 12 and wherein said elongated strip member further comprising:

a pair of flexible lip portions extending along the lower surface portion thereof between the opposite end portions of adjacent panel members and being sealably engaged with the adjacent panel members.

14. The invention as defined in claim 13 and wherein: said groove means comprising a generally semicircular inner portion and a curved slot portion extending outwardly therefrom;

said elongated strip member having panel connecting rib portions of generally semi-circular cross-section mounted in said generally semi-circular inner portion of said groove means of adjacent panel members and having panel connecting flange portions mounted in said curved slot portion of said groove means of adjacent panel members.

15. The invention as defined in claim 14 and wherein: the radius of said semi-circular inner portion of said groove means is larger than the radius of said panel connecting rib portions; and the width of said slot portion of said groove means is approximately equal to the width of said panel connecting flange portions of said strip member.

16. The invention as defined in claim 12 wherein said guide and support track means further comprising longitudinally extending fluid flow channel means for receiving fluid from said generally U-shape fluid flow channel means on said elongated strip members.

17. The invention as defined in claim 16 wherein said fluid flow channel means of said guide and support track means extending to the rear end portion of said cargo space for causing fluid flow away from the cargo space.

18. The invention as defined in claims 1 or 17 and wherein each of said guide and support track means comprising:

elongated channel-shape plate means having an upper wall portion, a lower wall portion, an outer side wall portion which define an inwardly facing slot for receiving said end portions of said panel members with the upper surface of said panel members located adjacent a lower surface on said upper wall portion and the end surfaces of said panel members located adjacent an inner surface of said outer side wall portion and the end portions of said panel members located in said slot.

19. The invention as defined in claim 18, wherein each of said guide and support track means further comprising:

low friction panel bearing means mounted on said lower wall portion for slidably supportive engagement with the lower surfaces of said panel members.

20. The invention as defined in claim 19 and wherein said channel plate means is made from one piece of aluminum material.

21. The invention as defined in claim 20 and wherein: said low friction panel bearing means comprises an elongated one-piece strip of low friction plastic material having a flat upper surface engaging said panel members and defining a relatively narrow width panel slot between the lower surface of said upper wall portion and said flat upper surface which is slightly wider than the thickness of the end portions of said panel members which extend through said narrow width panel slot.

22. The invention as defined in claim 21 and wherein said channel-shape plate means having an inner side wall flange portion extending upwardly from said lower side wall portion and being inwardly spaced from said outer side wall portion and being downwardly spaced from said upper wall portion to define elongated fluid flow channel means therebetween which extend from the front to the rear of the truck bed.

23. The invention as defined in claim 22 and wherein said low friction panel bearing means having an elongated downwardly facing mounting slot; said inner side wall flange portion of said channel shape plate means being located in said mounting slot and extending continuously from the front to the rear of the truck bed.

24. The invention as defined in claim 23 and wherein said channel-shape plate means further comprising:

storage box guide and support means for slidably supporting a storage box means beneath said cover means for slidable movement between the front end and the rear end of the truck bed.

25. The invention as defined in claim 19 and further comprising:

a resistant flexible sealing strip means mounted on and extending along the length of said channel plate means for abutting sliding engagement with the upper surface of said opposite end portion of said panel members adjacent said guide and support track means.

26. The invention as defined in claim 1 and wherein said reel means comprising:

at least two separate reel units mounted on opposite sides and adjacent the side wall portions of the truck bed for supportively engaging opposite end portions of said panel members.

27. The invention as defined in claim 26 and wherein said reel units comprise:

endless loop chain members having a non-circular path of movement including at least two straight line portions and at least two curved line portions; at least two sprocket wheel members for driveably supporting each of said endless loop chain members; and pivotal connecting means for connecting opposite end portions of the first panel member to each of said endless loop chain members.

28. The invention as defined in claim 27 and wherein said reel means further comprising:

rotatable shaft means extending laterally across the truck bed between said reel units and rotatably supporting one of said sprocket wheel members of each reel unit; and an electric motor means connected to said rotatable shift means for selectively causing uniform simultaneous rotation of said sprocket wheel members and movement of said reel units.

29. The invention as defined in claim 28 and wherein said cover drive means further comprising:

rotatable shaft means extending across the truck bed between said drum members and being rotatably driveably connected thereto;

an electric motor means connected to said shaft means for selectively causing uniform simultaneous rotation of said drum members and movement of said cover means.

30. The invention as defined in claim 29 and further comprising:

synchronization means for causing simultaneous uniform coordinated movement of each of said drum members and each of said reel units upon actuation by said motor means.

* * * * *